INVENTOR.
AVARD F. FAIRBANKS
BY William R. Lane
ATTORNEY

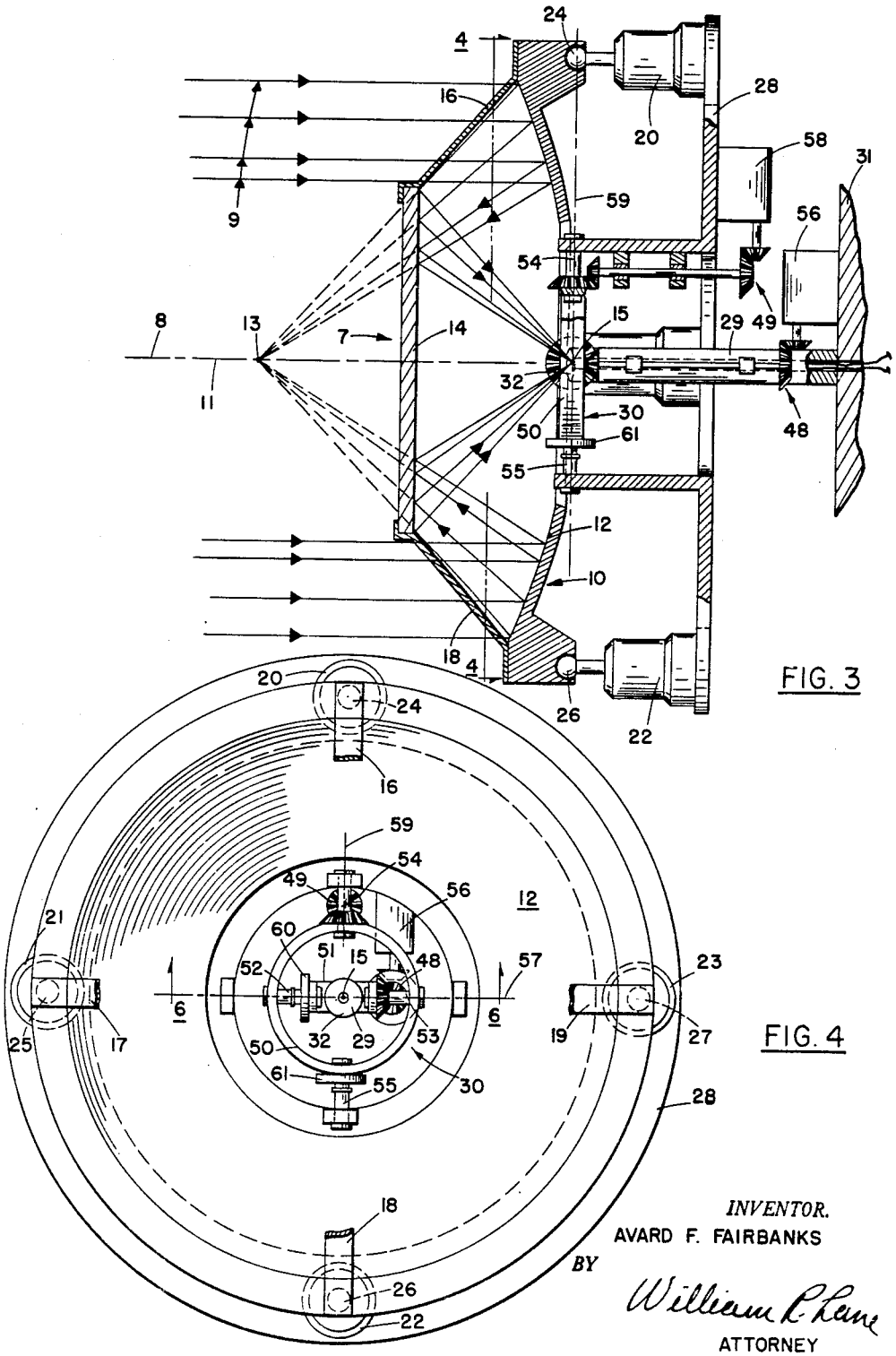

INVENTOR.
AVARD F. FAIRBANKS
BY William R. Lane
ATTORNEY

INVENTOR.
AVARD F. FAIRBANKS
BY
ATTORNEY

United States Patent Office 3,116,418
Patented Dec. 31, 1963

3,116,418
INFRARED SEARCHING AND TRACKING APPARATUS UTILIZING A SPIRAL SCAN
Avard F. Fairbanks, South San Gabriel, Calif., assignor to North American Aviation, Inc.
Filed Oct. 5, 1954, Ser. No. 460,296
11 Claims. (Cl. 250—83.3)

This invention relates to searching and tracking devices and particularly to a combination scanning-tracking detector of radiating targets.

Numerous nautical and aeronautical problems require the accurate detection and tracking of a target aircraft, missile, tank or other object. Almost all of the objects which are of interest to the tracker are fuel burning or otherwise "hot" objects. Objects of this nature are continuous emitters of some form of radiant energy such as heat or infrared rays. A tracking problem, particularly a military tracking problem, requires a continuous indication of the range to the target, and of the bearing or angular position of the target with respect to one or more reference planes. An accurate range indication is readily obtainable by such devices as radar which, however, require elaborate antenna systems to obtain good angular resolution. This is especially true if the radar antenna must be mounted in the nose of an aircraft or missile and therefore have a small physical size.

Small telescopic devices are readily constructed with a high degree of directional sensitivity in gathering radiant energy from a source thereof and casting it on to a sensitive element. These highly directional telescopes are only sensitive to those radiating targets which are within a very small solid angle of sensitivity around the optical axis or narrow field of view of the telescope. Rays from targets which are positioned outside this solid angle of sensitivity are not directed to the sensitive element by the telescope. Taken alone, a highly directional telescope is not very useful in searching out and tracking a target whose initial position, course, and speed are unknown. Not only is it very difficult to initially find the target with this type of detector but it is also difficult to refind the target if, for some reason, it has been lost. Therefore, some means must be provided to align the optical axis of the telescope with the line of sight to the target and then to maintain some measurable axis continuously coincident with the line of sight to the target.

The radiating target is usually located in some unknown position within a comparatively large solid angle of search. A solid angle is a portion of space about a given point, bounded by a conical surface with vertex at that point. This angle may be considered to be composed of an infinite number of unidirectional lines emanating from the vertex and enclosed by the conical surface. Any one of these unidirectional lines may be considered the search axis or the reference axis of the search angle. All other lines of the search angle are in a fixed angular relationship with this search axis. Thus, in a circular solid search angle, i.e., the space about a point bounded by a circular conical surface, the axis of the circular cone is usually selected as the search axis. It is noted that if the bearing or angular position of the search axis is changed with respect to a given reference plane, the entire solid search angle rotates through a corresponding angle with respect to the reference plane. The bearing of the search axis is usually indicated by two position angles, one in elevation, and the other in azimuth. The elevation position angle is the angle the search axis makes with the given reference plane. The azimuth position angle is the angle, measured in the reference plane, between a given reference line in the plane and the projection of the search axis on the reference plane.

One method of finding a radiating target within the aforementioned solid search angle is to systematically scan all portions of the search angle with the telescope. In this way the optical axis of the telescope is pointed in the direction of the radiating target for a finite period of time. During that period of time the optical axis is in coincidence with the line of sight to the target and the sensitive element of the telescope is subjected to the radiant energy from the target. Once the target is detected by the telescope, it is desired to automatically cease searching for the target and to start tracking the target. While tracking, the apparatus should continuously produce outputs which are a predetermined function of the position angles of the line of sight to the target. If the search axis, previously described, is made to coincide with the line of sight to the target at all times, an accurate measurement of the angular bearing of the search axis produces the desired outputs. Thus, rather than measuring the instantaneous angular position of the rapidly oscillating optical axis of the telescope, it is only necessary to measure the angular position of the relatively slow moving search axis. During the tracking operation the angle of search should be collapsed to a very small solid angle about the search axis.

It is therefore an object of this invention to provide an improved automatic scanning and tracking apparatus for detecting a source of radiant energy.

It is another object of this invention to provide a scanning system which systematically scans a large solid search angle for source of radiant energy and which progressively moves the search axis of said angle toward coincidence with a line of sight to the source of radiant energy within the search angle.

It is a further object of this invention to provide in a scanning system for detecting and tracking a radiating target, means for reducing the size of the search angle whenever a target is detected.

It is another object of this invention to provide a scanning system for detecting and tracking heat radiating targets including means for progressively moving the search axis toward the line of sight to the target while simultaneously decreasing the size of the search angle.

It is a further object of this invention to provide an improved drive for antennas comprising means for oscillating a highly directional antenna in a repetitious spiral conical pattern about a search axis, means responsive to reception of a signal by said antenna for progressively moving said search axis toward the bearing of said antenna at the time of reception of said signal, and means for simultaneously reducing the size of said spiral conical pattern.

Other objects of invention will become apparent from the following description taken in connection with the accompanying drawings, in which FIG. 1 is a sketch of the preferred scanning pattern utilized by the telescopic device contemplated by this invention for searching a solid circular search angle for radiating targets;

FIG. 3 is a view, partly in section, of a preferred embodiment of the searching and tracking apparatus contemplated by this invention;

FIG. 4 is a sectioned view of the apparatus of FIG. 3 taken along the line 4—4;

Figure 1:
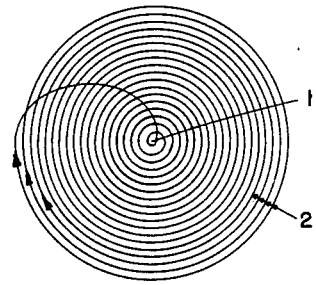

Referring to FIG. 1, a preferred scan pattern utilized by the apparatus contemplated by this invention for detecting a target within a large solid search angle is shown. This pattern represents the successive intersections of the optical axis of a highly directional telescope and a plane normal to the search axis of the search angle. Point 1 represents the intercept of the search axis with the plane. Line 2 is the pattern traced by the optical axis of the telescope as the telescope progressively scans in a spiral conical pattern all portions of the search angle. When the outer extremities of the search angle are reached, the telescope is reaimed along the search axis and the scanning operation repeated. In FIG. 1 it is assumed that no radiating target is present within the search angle and therefore the apparatus repeats its searching function.

Figure 2:
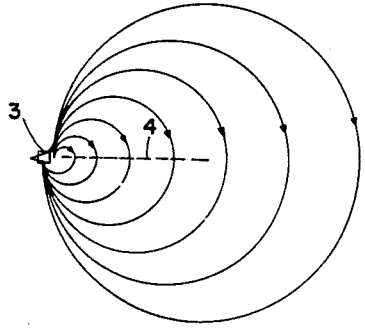
FIG. 2 is a sketch showing the collapsing pattern followed by the telescopic device contemplated by this invention when a radiating target is detected.

When a target is detected within the search angle, circuit elements, to be described later, cause the scanning pattern to collapse in a manner similar to that shown in FIG. 2. As shown in FIG. 2 the search axis is progressively moved toward coincidence with the line of sight to the target and the size of the scanning pattern is progressively reduced. Thus, detection of the radiating target by the sensitive element of the telescope results in the alignment of the search axis with the line of sight to the target. Simultaneously the apparatus switches from a searching function to a tracking function. Assume target 3 within the search angle is detected by the telescopic device. By means described below, the detection of target 3 by the sensitive element of the telescope results in a torquing of a telescope mounting platform in a direction to cause movement of the search axis along dotted line 4 toward target 3. At the same time the scanning spiral tracked by the optical axis of the telescope decreases in size. Each time the sensitive element detects target 3, search axis 1 is moved toward target 3 and the size of the spiral conical scan is reduced a predetermined amount. Finally, the search axis is substantially coincident with the line of sight to target 3. Except for a slight oscillation permitted for accuracy, the search axis, the optical axis, and the line of sight to the target continue to coincide. An angular change in bearing of the target is immediately followed by a corresponding movement of the search axis. Thus, the function of the apparatus has been automatically changed from search to track.

Referring now to FIGS. 3 and 4, views, partly in section, of the preferred embodiment of the scanning and tracking apparatus apparatus are shown. Optical system 10 consists of telescope 7, telescope base or platform 28 and a plurality of linear electric actuators connecting telescope 7 to platform 28. Telescope 7 of this apparatus is preferably a highly directional reflecting telescope having optical axis 11 and consisting of parabolic primary mirror 12 with focal point 13 and flat secondary mirror 14. Mirror 14 intercepts the rays directed by mirror 12 toward focal point 13 and redirects them to point 15. Point 15 is therefore the focal point of telescope 7. The relative spacing between mirrors 12 and 14 is maintained constant by equispaced spider support arms 16, 17, 18, and 19. Arms 16, 17, 18, and 19 preferably are constructed of a material having negligible expansion or contraction over the contemplated temperature range of operation. Telescope 7 is supported by linear electric actuators 20, 21, 22, and 23 (shown in their unactuated positions). Ball and socket joints 24, 25, 26 and 27 attach the movable plungers of actuators 20, 21, 22 and 23, respectively, to the base of mirror 12. The stationary portions of the actuators are rigidly attached to telescope base 28. As long as actuators 20–23 remain unactuated, optical axis 11 coincides with search axis 8. Search axis 8 is at all times in a fixed angular position with respect to telescope base 28.

Radiant energy rays 9, emanating from a source (not shown) positioned along optical axis 11 of telescope 7, enter the telescope parallel to axis 11. Parabolic mirror 12 reflects parallel rays 9 and directs them toward focal point 13. Flat mirror 14 intercepts the reflected rays and redirects them to focal point 15. Thus, substantially all of the rays of radiant energy entering telescope 7 parallel to sensitive axis 11 are concentrated at focal point 15.

Gimbal system 30, having two degrees of freedom, supports telescope base 28 from shaft 29. Shaft 29 is rigidly attached to frame 31 which is in fixed orientation with respect to a reference plane. For purposes of explanation, it is assumed that frame 31 is rigidly attached to a stabilized platform (not shown) and that the plane of frame 31 is the aforementioned reference plane. Photosensitive cell 32, supported by shaft 29, is positioned at focal point 15. Cell 32 is preferably a very small photoconducting type cell utilizing lead sulfide, lead selenide, or lead telluride. Shaft 29 has a hollow core for passage of wires connecting the terminals of cell 32 to external circuitry, to be described later. Gimbal system 30 is adapted to rotate optical system 10 about two orthogonal axes which intersect at focal point 15. Actuators 20, 21, 22, and 23 are adapted to rapidly oscillate telescope 7 about focal point 15.

Figure 5:
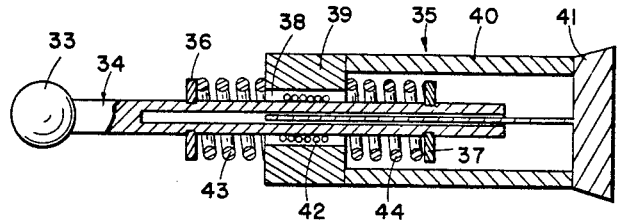
FIG. 5 is a sectioned view of a linear electric actuator utilized in the apparatus of FIG. 3.

Referring now to FIG. 5, a sectioned view of a typical linear electric actuator utilized in the apparatus of FIGS. 3 and 4 to support telescope 7 from platform 28 is shown. Ball 33 of plunger 34 fits into a socket in the base supporting mirror 12. Actuator base 35 is rigidly attached to platform 28. Plunger 34 is adapted to freely slide, within the limits imposed by lips 36 and 37, in an axial direction in base 35. Plunger 34 is composed of a non-magnetic material such as copper so as not to affect the magnetic fields generated by base 35. Base 35 preferably contains a permanent magnet and is adapted to generate a constant radial field in air gap 38. Base 35 therefore consists of radial pole piece 39, permanent magnet shell 40 and central pole piece 41. Assuming shell 40 is magnetized with a north magnetic pole to the left and a south magnetic pole to the right in FIG. 5, the magnetic lines of force leave radial pole piece 39 and travel radially inward through plunger 34 and into central pole piece 41. They then travel to the right in center piece 41 and re-enter shell 40 at its south magnetic pole. Thus air gap 38 is subjected to a constant magnetic field in a radial direction. Coil 42 is wound on and rigidly attached to plunger 34. Coil 42 is attached to external circuitry which subjects the coil to a predetermined variable voltage as will be explained in greater detail with respect to FIG. 7. It is to be noted that the direction of the force exerted on coil 42 due to the action of the radial magnetic field in air gap 38 depends on the direction of current flow in the wires of coil 42 and therefore on the polarity of the applied voltage. The magnitude of this force depends on the magnitude of the applied voltage. Movement of plunger 34 in response to this electromagnetic force is opposed by linear springs 43 and 44. Therefore, the movement of plunger 34 is also proportional to the magnitude of the impressed voltage. Thus, if a sinusoidal voltage is impressed across coil 42, plunger 34 oscillates sinusoidally.

Figure 6:
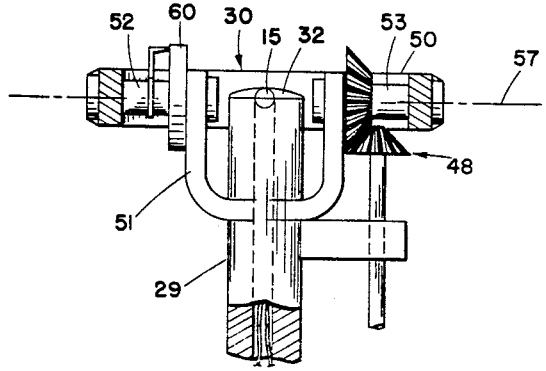
FIG. 6 is a detailed view, of the gimbal system used to support the apparatus of FIG. 4 taken along the line 6—6.

Referring now to FIGS. 3, 4, and 6, views of gimbal system 30 supporting optical system 10 in azimuth and elevation are shown. Gimbal ring 50 is supported by yoke 51 of shaft 29 through pinions 52 and 53. Gimbal ring 50 supports optical system 10 through pinions 54 and 55. The axes of pinions 52 and 53 and pinions 54 and 55 are orthogonal and intersect at focal point 15. Elevation motor 56 is positioned to drive gear train 48 to rotate gimbal ring 50 and optical system 10 about elevation axis 57. Azimuth motor 58 is positioned to drive gear train 49 to rotate optical system 10 about azimuth axis 59. Motors 56 and 58 are actuated in accordance with slewing signals or pulsed alignment signals from sources to be described later. Angle pick-offs 60 and 61 are provided to produce instantaneous indications of the angular position of search axis 8 of optical system 10 about elevation axis 57 and azimuth axis 59, respectively. It is to be noted that pick-offs 60 and 61 indicate the angular bearing of the search axis of the search angle and not the instantaneous angular position of optical axis 11. Pick-offs 60 and 61 are preferably linearly wound, ring potentiometers subjected to a D.-C. potential. The wipers of pick-offs 60 and 61 are attached to pinions 52 and 55, respectively and the resistance elements are attached to yoke 51 and gimbal ring 50, respectively. Motors 56 and 58 are preferably reversible D.-C. motors connected through gear trains 48 and 49 respectively to bidirectionally rotate optical system 10 about axes 57 and 59, respectively.

Figure 7:
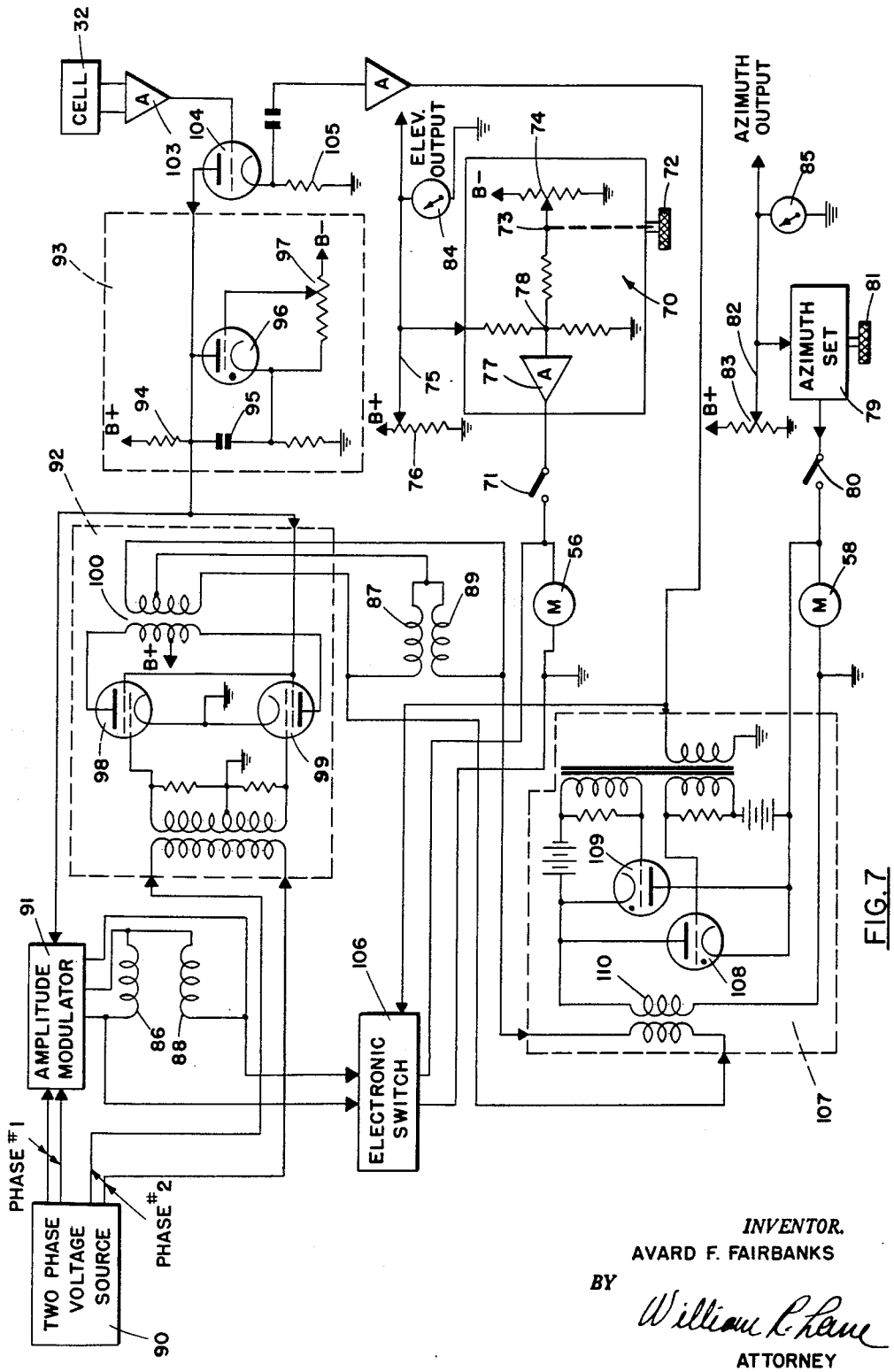
FIG. 7 is a schematic drawing of an electronic circuit used with the apparatus of FIG. 3.

Referring now to FIG. 7, a schematic drawing of the electronic circuit utilized to control the movement of the apparatus of FIG. 3 is shown. The circuit can best be described by following through a cycle of operation.

First, consider the operation of the search and tracking apparatus when only a search function is to be performed, i.e., no target is detected within the solid search angle. The apparatus is aimed in elevation and azimuth utilizing motors 56 and 58, respectively. Motors 56 and 58 are reversible D.-C. motors. The speed and direction of rotation of the motors is determined by the magnitude and polarity of the voltage applied to their terminals. Motor 56 is initially connected to elevation set 70 by closing switch 71. The desired bearing in elevation of search axis 8 of the search angle is preset by an initial adjustment to knob 72 which controls the position of wiper 73 on potentiometer 74. Elevation set 70 is essentially a comparator network which compares a potential from wiper 75 of elevation pick-off potentiometer 76 with the potential of wiper 73 and produces an output voltage through amplifier 77 which is proportional to the deviation of terminal 78 from a ground potential. The potentials applied to potentiometers 76 and 74 are of opposite polarity. As long as the two potentials picked off by wipers 73 and 75 are not in a predetermined proportion, terminal 78 is not at ground potential and motor 56 is energized through amplifier 77 and switch 71. The polarity of the voltage applied to motor 56 determines the direction of rotation of gear train 48. Rotation of gear train 48 rotates optical system 10 about elevation axis 57. In addition to changing the elevation position angle of search axis 8, this rotation necessarily changes the position of wiper 75 on potentiometer 76 thereby completing the closed servo loop. When terminal 78 is at ground potential, motor 56 is de-energized. Similarly, motor 58 is initially connected to azimuth set 79 by closing switch 80. Knob 81 presets the desired bearing in azimuth of the search axis. By a circuit similar to that previously described with respect to elevation set 70, azimuth set 79 energizes motor 58 to cause rotation of optical system 10 about azimuth axis 59. Search axis is thereby slewed to the desired bearing, as indicated by the potential picked off by wiper 82 on azimuth angle pickoff potentiometer 83. When the apparatus is aimed in the desired bearings in azimuth and elevation, switches 71 and 80 are opened. Meters 84 and 85 continuously indicate the elevation position angle and the azimuth position angle of the search axis. Whenever a new sector is to be searched by the telescopic apparatus of this invention, the settings of knobs 72 and 81 are changed and switches 71 and 80 are closed until the apparatus has been slewed to the new bearing.

As previously pointed out, the optical axis of the telescope is to scan a conical search angle in a spiral fashion as indicated in FIG. 1. To accomplish this scanning pattern, equispaced linear electric actuators 20, 21, 22, and 23 in FIGS. 3 and 4 cause a programmed oscillation of telescope 7 about focal point 15. As indicated above, the plungers of actuators 20–23 oscillate in a direction and of a magnitude determined by the voltage applied to their coils. Assume that the voltages applied to the coils of actuators 20 and 22 are at all times equal and opposite. If sinusoidal voltages are applied to these coils equal in magnitude but 180° out of phase, optical system 10 oscillates in a sinusoidal manner about an axis through focal point 15 and normal to the plane of motion of the plungers of the actuators. Similarly, applying sinusoidal voltages to the coils of actuators 21 and 23 again equal in magnitude but 180° out of phase with each other causes optical system 10 to oscillate in a sinusoidal fashion about an axis through focal point 15 and normal to the plane of motion of the plungers of the actuators. When the amplitudes of the sinusoidal voltages applied to the coils of actuators 20–23 are all equal in magnitude but the phase of the sinusoidal voltages applied to actuators 21 and 23 is shifted 90° with respect to the sinusoidal voltages applied to actuators 20 and 22, the optical axis of optical system 10 is oscillated in a conical manner, i.e., optical axis 11 outlines the surface of a circular cone. By amplitude modulating both of these sinusoidal voltages with the same sawtooth wave form, the spiral scan pattern indicated by FIG. 1 is obtained. Optical axis 11 thereby follows a spiral conical scan pattern effectively scanning all portions of a solid search angle having as its principal axis the aforementioned null or search axis.

Referring again to FIG. 7, two-phase voltage source 90 produces constant amplitude, constant frequency voltage outputs which differ by a 90° phase shift. Phase #1 is coupled through amplitude modulator 91 to coils 86 and 88 of actuators 20 and 22, respectively. Phase #2 is coupled through amplitude modulator 92 to coils 87 and 89 of actuators 21 and 23, respectively. Amplitude modulators 91 and 92 vary the amplitudes of the voltages applied to the actuators in accordance with the output of sawtooth generator 93. Sawtooth generator 93 utilizes a series connection of resistor 94 and capacitor 95 connected across a source of D.-C. potential. The time constant of this network is sufficiently long to result in an essentially linear charging of capacitor 95 over the desired voltage range of the output. Gas-filled triode 96 is connected across capacitor 95. When the voltage across capacitor 95 reaches a predetermined magnitude, tube 96 fires, discharging capacitor 94. The firing point of tube 96 is determined by the setting of biasing potentiometer 97. When capacitor 95 is substantially completely discharged, tube 96 extinguishes, since the current supplied through resistor 94 alone is insufficient to sustain the gas discharge of tube 96. Capacitor 95 then recharges and the cycle is repeated.

Amplitude modulator 92 preferably consists of tetrodes 98 and 99 connected in push pull. The voltage of one phase from source 90 is applied in phase opposition to the control grids of tubes 98 and 99 while the output of sawtooth generator 93 is applied to the screen grid of both tubes. Therefore, the magnitude of the plate current through tubes 98 and 99 is dependent not only on the voltages applied to the control grids but also on the varying potential on the screen grids. This results in an output from the secondary winding of plate transformer 100 having as a wave form a sawtooth modulated sine wave. This output voltage is applied to coils 87 and 89 of actuators 21 and 23 connected in series opposition. Therefore actuators 21 and 23 aid each other in rotating telescope 7 about one axis of rotation. The amplitude of rotation is dependent on the amplitude of the output of generator 93. Similarly amplitude modulator 91 generates a sawtooth modulated sinusoidal voltage which is connected across coils 86 and 88 of actuators 20 and 22 connected in series opposition. Actuators 20 and 22 therefore aid each other in causing telescope 7 to oscillate about the second axis of rotation. Since the voltages applied to coils 87 and 89 are shifted 90° with respect to the voltages applied to coils 86 and 88, telescope 7 is made to oscillate in a spiral conical pattern with an apex at focal point 15. The outer extremities of this pattern are determined by the maximum potential from sawtooth generator 93. The angular spacing between successive cycles of the pattern is determined by the slope of the sawtooth wave form. The speed of cycling in the pattern is dependent on the frequency of the output voltages from source 90. As long as a radiating target is not detected within the search angle, telescope 7 continues to oscillate with the spiral scan pattern.

Referring again to FIG. 3, when a radiating target (not shown) is somewhere along sensitive axis 11 of telescope 7, heat or infrared rays 9 from the target enter the telescope parallel to sensitive axis 11. These rays are concentrated by mirrors 12 and 14 on to photosensitive cell 32 at focal point 15. Photosensitive cell 32 is preferably the photoconductive type, utilizing lead sulfide, lead selenide, or lead telluride, all of which exhibit a decreased resitivity when irradiated by heat waves of wavelength between one micron and 4.5 microns. Increased sensitivity is obtained by cooling the cell. However, other infrared detectors, such as a bolometer, may be used.

Referring to FIG. 7, the change in potential across cell 32 triggers amplifier 103. The output of amplifier 103 is coupled to the grid of collapsing tube 104. This output is preferably in the nature of a short, positive constant amplitude pulse each time cell 32 detects a target. Tube 104 conducts for a brief moment through resistor 94 thereby causing a small step discharge of capacitor 95. The fractional discharge of capacitor 95 is communicated to actuators 20, 21, 22, and 23 through modulators 91 and 92 and is in the form of a reduction in the magnitude of the A.-C. signal applied to the coils of the actuators. By this means, the instantaneous size of the scan of telescope 7 is reduced. Thus each time photosensitive cell 32 detects a target the instantaneous size of the scanning pattern is reduced a small amount. It is to be noted that as long as a radiating target is detectable within the search angle, the full search cycle does not take place.

Simultaneously, the conduction of collapsing tube 104 generates a positive pulsed output across cathode resistor 105 which is coupled into electronic switches 106 and 107. Under certain circumstances depending upon the bearing of the target with respect to the reference axis of the search angle, electronic switches 106 and/or 107 permit the passage of small pulses to motors 56 and 58, respectively. These small pulses cause a small rotation of optical system 10 in a direction to move search axis 8 toward coincidence with the line of sight to the target.

Electronic switch 107 is shown in detail. Triodes 108 and 109 are normally biased beyond cut-off. Motor 58 is connected in series with tubes 108 and 109 across the secondary of transformer 110. Transformer 110 is subjected to the output of amplitude modulator 92. If either tube 108 or tube 109 is caused to conduct, a large pulse of current passes through motor 58 causing its rotor to turn a predetermined amount. The conduction of tubes 108 or 109 is controlled by the pulse output across cathode resistor 105 of collapsing tube 104. The magnitude of the current flowing to motor 58 depends upon the instantaneous magnitude of the sinusoidal output of modulator 92 as applied to coils 87 and 89. The polarity of the current pulse flowing to winding 85 depends on the instantaneous polarity of the sinusoidal output voltage of modulator 92. When the target is near the outer extremities of the search angle, the signal voltage applied to the coils of actuators 21 and 23 oscillates between maximum values. Assume the target is detected when this signal is at a peak value. Under these conditions, a maximum amount of current passes through motor 58, causing a maximum movement of its rotor and therefore a large angular rotation of optical system 10. The direction of rotation is such as to decrease the angle between search axis 8 and the line of sight to the target. As the search axis moves closer to the line of sight to the target, the size of the pulses of current through motor 58 decreases since the magnitudes of the signal voltage to actuators 21 and 23 decreases. Finally, the search axis substantially coincides with the line of sight to the target. Similarly, if the target is detected while maximum signal voltages are being applied to the coils of actuators 20 and 22, electronic switch 106 conveys large pulses to motor 56 causing a large angular rotation of optical system 10. These pulses decrease as the search axis approaches coincidence with the line of sight to the target. It is to be noted that if it is desired to progressively move the search axis toward coincidence with the line of sight to the target in equal step increments, modulators 91 and 92 should be bypassed and the outputs of source 90 applied directly to switches 106 and 107.

The searching and tracking apparatus, above described, automatically switches from a searching function to a tracking function whenever a radiating target enters the search angle. The structure, utilized to bring the search axis of the search angle progressively into coincidence with the line of sight to the target, eliminates the need for an elaborate synchronized network for continuously indicating or predicting the bearing of the optical axis of telescope 7. Thus it is only necessary to produce an indication of the bearing of the comparatively slow moving search axis rather than the rapidly oscillating optical axis of the system. It is also to be noted that the apparatus of this invention is particularly adept at automatically tracking radiating targets in spite of temporary interruptions of the rays. When the target is lost due to any reason, the apparatus immediately returns to the search function with the initial search axis of the search angle in line with the last known line of sight to the target. Subsequent detection of the target is immediately followed by a realignment of the search axis and a collapse of the scan pattern in the manner previously described.

Figure 8:
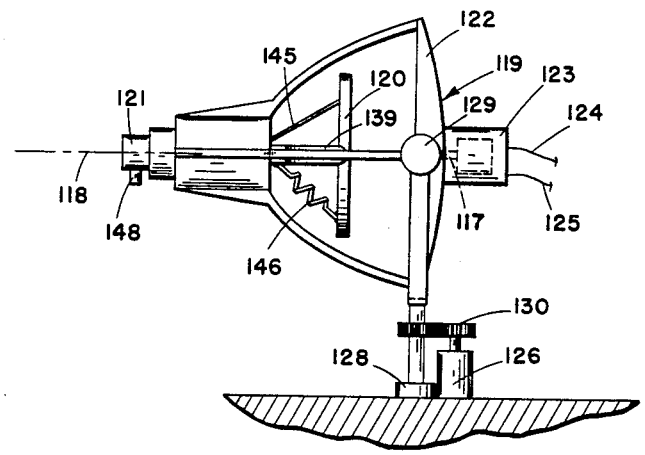
FIG. 8 is a side view of an alternate embodiment of the searching and tracking apparatus contemplated by this invention.
Figure 9:
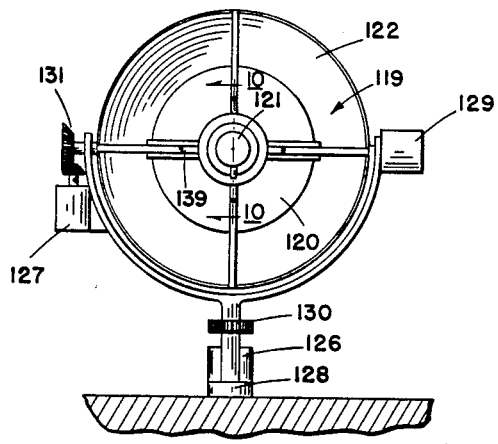
FIG. 9 is a plan view of the apparatus of FIG. 8.

An alternate embodiment of the searching and tracking apparatus contemplated by this invention is shown in FIGS. 8 and 9. In this embodiment, the spiral conical scan pattern of telescope 119 is obtained by varying the tilt angle of flat secondary mirror 120 while simultaneously rapidly revolving the mirror about search axis 118. Telescope 119 consists of flat mirror 120, parabolic mirror 122, and sensitive element 117. Rotation of mirror 120 in a clockwise direction in FIG. 8 causes deflection of the sensitive axis of telescope 119 below search axis 118. This means that only radiant energy from a target which is located a predetermined angle (dependent on the angle of tilt) below the search axis will be directed by telescope 119 to sensitive element 117. Similarly, tilting mirror 120 in a counterclockwise direction makes the telescope sensitive to radiating targets above the search axis. Movement of the search axis toward the line of sight to a detected target is accomplished by utilizing jet torquer 121 which is constantly revolved in a fixed angular relationship with mirror 120. Since parabolic mirror 122 is not rapidly oscillated, it is not necessary to separately mount the photosensitive cell. Therefore, housing 123 containing photosensitive element 117 is attached directly to mirror 122. Wires 124 and 125 electrically connect the cell to an external electronic circuit to be described later. Motors 126 and 127 are provided to aim through gear trains 130 and 131 the optical system in azimuth and elevation, respectively. Azimuth pick-off 128 and elevation pick-off 129 are provided to give instantaneous readings of the search axis in azimuth and elevation.

Figure 10:
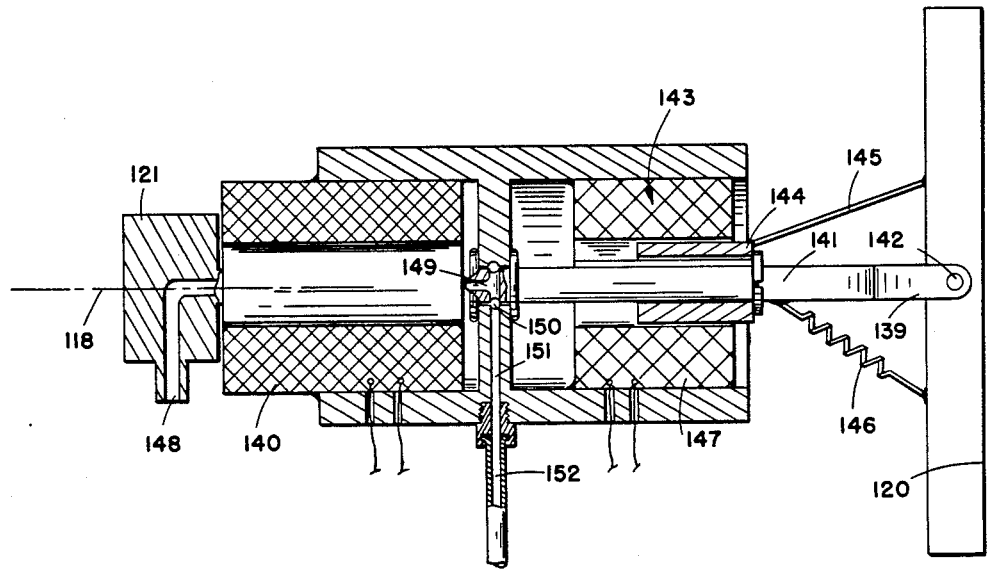
FIG. 10 is a sectioned view of the secondary mirror drive utilized in the apparatus of FIG. 9 taken along the line 10—10.

Referring now to FIG. 10, a sectioned view of the mechanism for tilting and rotating secondary mirror 120 is shown. Motor 140 continuously rotates shaft 141 with a predetermined angular velocity. Mirror 120 is pivotally attached through yoke 139 and pin 142 to shaft 141 and therefore revolves about search axis 118 with shaft 141. Solenoid 143 acts on plunger 144 to eccentrically load mirror 120 utilizing link 145. Spring 146 attached between mirror 120 and shaft 141 opposes the tilting movement of mirror 120. Thus, the pulling force of solenoid 143 on plunger 144 acting in opposition to the restraining force of spring 146 determines the tilt angle of mirror 120. Therefore the angle of tilt of mirror 120 is made a predetermined function of the current in coil 147 of solenoid 143. Air jet torquer 121 is rigidly attached to shaft 141 and, therefore, revolves with mirror 120 about search axis 118. Air under pressure is supplied to nozzle 148 of air jet torquer 121 through duct 149, annular cavity 150, duct 151, and air line 152. A solenoid actuated air valve (to be described later) controls the flow of air through air line 152 to nozzle 148. Actuation of this solenoid air valve is controlled by the photosensitive cell.

Figure 11:
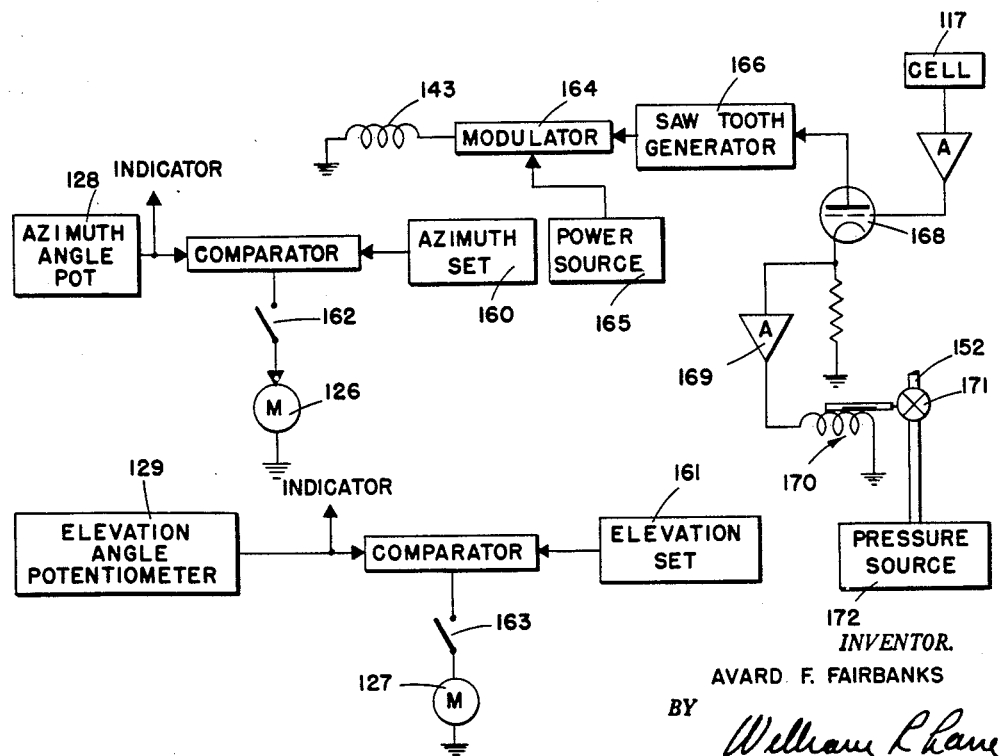
FIG. 11 is a schematic drawing of the electronic circuits utilized with the apparatus of FIG. 8.

Referring to FIG. 11 an electronic circuit for controlling the apparatus of FIG. 8 is shown. In a manner similar to that previously described with respect to the apparatus of FIG. 3, the scanning apparatus is initially aimed in azimuth and elevation utilizing azimuth set 160 and elevation set 161 to actuate motors 126 and 127, respectively. When the apparatus is properly aimed along a preset search axis, opening switches 162 and 163 isolate motors 126 and 127, respectively. Tilting solenoid 143 is subjected to a sawtooth modulated A.-C. voltage from amplitude modulator 164. Amplitude modulator 164 is subjected to an A.-C. potential from source 165 and a sawtooth modulating potential from sawtooth generator 166. Plunger 144 of solenoid 143 is insensitive to the A.-C. component of the potential from modulator 164. Therefore, the movement of plunger 144 varies linearly in accordance with the sawtooth wave form. The angle of tilt of mirror 120 varies in a corresponding manner. As the angle of tilt of mirror 120 changes the sensitive axis of the telescope changes a corresponding amount. Since mirror 120 is simultaneously continuously revolving with shaft 141, the desired spiral conical scan is obtained. In the manner similar to the previously described with respect to FIG. 7, actuation of photosensitive cell 117 by the detection of radiant energy, results in a step collapse of the scanning pattern. This is accomplished electronically by decreasing the instantaneous magnitude of the sawtooth output from generator 166 and thereby decreasing the force exerted by solenoid 143 on plunger 144.

Simultaneously the pulsed conduction of collapsing tube 168 is coupled through amplifier 169 to air valve solenoid 170. The pulse actuation of solenoid 170 allows a small volume of air under pressure to pass from source 172 through valve 171 to air line 152 and out nozzle 148 of FIG. 10. Since there is a finite predictable time lag between actuation of solenoid 170 and the torquing of the apparatus by the jet of air out of nozzle 148, the angular position of nozzle 148 is accurately adjusted to produce the correct direction of applied torque. This direction is such as to cause movement of search axis 118 toward the line of sight to the detected target. Thus, assuming a target which is in line with the search axis in azimuth but above the reference axis in elevation, the target will be detected when mirror 120 is tilted slightly counter-clockwise in FIG. 8. At the instant of detection solenoid 170 is actuated by the pulse conduction of tube 168. After a finite period of time during which mirror 120 continues to rotate, a jet of air flows out of nozzle 148. At that instant nozzle 148 should be pointing substantially directly downward in order that the reaction force of the air jet causes rotation of the apparatus toward the target.

Although the invention has been described and illustrated in detail, it is to be clearly understood that the same is by way of limitation and example only and is not to be taken by way of limitation, the spirit and scope of this invention being limited only by the terms of the appended claims.

I claim:

1. A searching and tracking apparatus comprising a photosensitive element, a telescope having a limited field of view for gathering radiant energy from a source thereof and for casting it upon said photosensitive element, means for supporting said telescope with respect to a given reference plane, means for programmed scanning said telescope over a solid search angle having a predetermined search axis, said search angle being larger than said field of view and means responsive to said photosensitive element and said means for programmed scanning for progressively changing the orientation of said telescope with respect to said reference plane to bring said search axis into coincidence with the line of sight to said radiating source whereby the angular position of said search axis is an accurate indication of the line of sight to said radiating source.

2. A searching and tracking apparatus comprising a photosensitive cell, a telescope having a limited field of view and adapted to gather radiant energy from a source thereof and cast it upon said cell, means for periodically scanning said telescope over all portions of a solid search angle having a predetermined search axis, said search angle being greater than said limited field of view, means for torquing said telescope in a manner to change the bearing of said search axis, and means responsive to said photosensitive cell and said means for periodically scanning for actuating said torquing means to move said search axis toward the line of sight to said source of radiant energy whereby the bearing of said search axis is an accurate measure of the angular position of said radiating source.

3. A searching and tracking apparatus comprising a photosensitive cell, a telescope for gathering radiant energy from a source thereof and casting it upon said photosensitive cell, a scanning system for oscillating the optical axis of said telescope in a substantially conical spiral scan about the search axis of a solid circular search angle, and means responsive to said photosensitive cell and said scanning system for progressively rotating said scanning system a direction to move said search axis toward the line of sight to said radiating source whereby the angular position of said search axis is an accurate measure of the angular position of said radiating source.

4. A searching and tracking system for detecting and tracking a source of radiant energy comprising a photosensitive cell, a telescope for gathering radiant energy and casting it upon said cell, a programmed scanning system for aiming said telescope in a manner to cause the sensitive axis of said telescope to generate a spiral conical pattern with said cell at the vertex thereof, and means responsive to said photosensitive cell for rotating said scanning system and said telescope to move the major axis of said spiral conical pattern toward the line of sight to said radiating source whereby the angular position of said line of sight to said radiating source is continuously indicated by the angular position of said major axis of said spiral conical pattern.

5. A searching and tracking apparatus for determining the angular position of a radiating source of infrared rays comprising infrared receiver means aligned along a predetermined search axis and including an infrared sensitive cell, a telescope adapted to gather the infrared rays emanating from a source along its optical axis and to cast them upon said cell, and means for oscillating the optical axis of said telescope in a programmed manner with respect to said predetermined search axis of said receiver means; torquing means for rotating said receiver means about two orthogonal axes to thereby change the bearing of said search axis; and signal generating means responsive to the detection of infrared rays by said cell and to said oscillating means and connected to selectively actuate said torquing means in a manner to rotate said receiver means about said orthogonal axes, said rotation of said receiver means by said torquing means being in a direction to decrease the angle between said search axis and the line of sight to said radiating source whereby the angular position of said search axis is substantially a measure of the angular position of said radiating source.

6. A searching and tracking apparatus for detecting and tracking a radiating target within a solid search angle comprising optical means aligned along a predetermined search axis of said search angle and having a sensitive element responsive to the radiation of said target, highly directional telescope means adapted to gather radiant energy from a source thereof positioned along its sensitive axis and casting said radiant energy onto said sensitive element, and programmed scanning means adapted to conically scan said telescopic means in a manner to direct said sensitive axis over all portions of said solid search angle torquer means responsive to the output of said sensitive element of said optical means and said scanning means and connected to realign said optical system in a manner to move said search axis of said search angle toward the line of sight to said target, means for measuring the bearing of said search axis of said search angle, and means responsive to said sensitive element of said telescopic means and connected to said programmed scanning means to progressively reduce the size of said conical scanning of said telescopic means to thereby direct said sensitive axis of said telescopic means over all portions of a progressively smaller solid search angle including said search axis.

7. A searching and tracking apparatus for continuously indicating the angular position of a source of radiant energy with respect to a predetermined reference plane comprising a supporting structure oriented in a fixed angular relationship with respect to said reference plane; a platform; a gimbal system having degrees of freedom about two orthogonal axes supporting said platform from said supporting structure; torquers positioned to bidirectionally rotate said platform about each of said orthogonal axes in response to electric signals; angular pick-off means positioned to measure the angular relationship between said platform and said supporting structure about each of said orthogonal axes; a photosensitive element having an output signal whenever subjected to radiant energy; an optical system adapted to gather radiant energy from sources thereof positioned along its sensitive axis and to cast said energy onto said cell; means for supporting said optical system from said platform; means for scanning all portions of a solid search angle with the sensitive axis of said optical system in a programmed pattern about a null position; and means responsive to the output signal of said photosensitive element for selectively actuating said torquers to rotate said platform about said orthogonal axes in a direction to decrease the angular deviation of said sensitive axis of said optical system from said null position when aligned with said radiating source whereby said angular pick-offs continuously indicate the angular position of said radiating source as indicated by the null position of said optical system.

8. An apparatus as recited in claim 7 in which said means for scanning said search angle with said optical system comprises a plurality of linear electric actuators positioned to change in response to electric signals the angular position of said optical system with respect to said platform, and signal generating means adapted to generate electric signals with a predetermined wave form and connected to selectively actuate said solenoid actuators.

9. An apparatus as recited in claim 7 in which said optical system includes a reflecting telescope having at least one mirror and in which said means for scanning said search angle with said optical system comprises means for rotating said mirror about a null axis and means for programmed tilting said mirror with respect to said null axis.

10. A scanning and tracking apparatus comprising a photosensitive cell; a reflecting telescope having said photosensitive cell at its focal point; a source of two-phase constant frequency sinusoidal voltages; a sawtooth generator; modulators individually amplitude modulating each of the voltages from said two-phase source with the output of said sawtooth generator; a platform; bidirectional linear electric actuator means connecting said telescope to said platform and positioned to rotate said telescope about an axis perpendicular to the optical axis of said telescope and passing through said photosensitive cell; second bidirectional solenoid actuator means connecting said telescope to said platform and positioned to rotate said telescope about a second axis perpendicular to said first-named axis and to the optical axis of said telescope; means subjecting said first-named actuator means to the output of one of said modulators; means subjecting said second-named actuator means to the output of the other of said modulators; means responsive to said photosensitive cell for varying the amplitude of the output of said sawtooth generator; a supporting structure; a gimbal system having degrees of freedom about two orthogonal axes passing through said photosensitive cell for supporting said platform from said supporting structure; pick-offs positioned on said gimbal system and having outputs which are functions of the angular position of said platform with respect to said supporting structure about said orthogonal axes; motors positioned to rotate said platform about said orthogonal axes in response to electrical signals; and signal generating means responsive to said photosensitive cell and to the outputs of said modulators for pulsing said motors to rotate said platform in a direction to progressively move the optical axis of said telescope toward coincidence with the line of sight to a radiating target.

11. A scanning and tracking apparatus comprising a photosensitive cell, an optical system having a high degree of directional sensitivity for gathering radiant energy from a radiating source along its optical axis and focusing it on a focal point, support means supporting said optical system with said photosensitive cell at all times at said focal point, scanning means between said optical system and said supporting means adapted to oscillate said optical system in a predetermined manner about a reference axis, a gimbal system supporting said supporting means with rotational freedom about axes passing through said photosensitive cell, torquers on said gimbal system connected to rotate said supporting means about said axes through said photosensitive cell, and means responsive to said photosensitive cell for actuating said torquers to progressively rotate said supporting means in a direction to move said reference axis toward the line of sight to said radiating energy source whereby the angular position of said reference axis is a measure of the angular position of the line of sight to said source.

References Cited in the file of this patent

UNITED STATES PATENTS

| 2,855,521 | Blackstone | Oct. 7, 1958 |
| 3,015,249 | Taylor | Jan. 2, 1962 |